(12) United States Patent
Nass

(10) Patent No.: US 6,902,190 B2
(45) Date of Patent: Jun. 7, 2005

(54) ROLLOVER PROTECTION SYSTEM FOR MOTOR VEHICLES WITH SELF-HOLDING UNLOCKING MECHANISM

(75) Inventor: Michael Nass, Bergneustadt (DE)

(73) Assignee: ISE Innomotive Systems Europe GmbH (DE)

( * ) Notice: Subject to any disclaimer, the term of this patent is extended or adjusted under 35 U.S.C. 154(b) by 117 days.

(21) Appl. No.: 10/423,388

(22) Filed: Apr. 25, 2003

(65) Prior Publication Data

US 2003/0205891 A1 Nov. 6, 2003

(30) Foreign Application Priority Data

May 2, 2002 (DE) .......................................... 102 19 447

(51) Int. Cl.[7] .............................................. B60R 21/13
(52) U.S. Cl. ..................... 280/756; 74/529; 296/190.03
(58) Field of Search ................................ 280/753, 756; 180/274, 282; 296/190.03; 74/529, 577 M

(56) References Cited

U.S. PATENT DOCUMENTS 5,626,361 A * 5/1997 Heiner ....................... 280/756

FOREIGN PATENT DOCUMENTS

| DE | 43 42 400 | 2/1995 | |
| DE | 19750457 A1 * | 6/1999 | ........... B60R/21/13 |
| DE | 199 10 424 | 7/2000 | |
| DE | 100 40 642 | 9/2001 | |
| DE | 100 42 420 | 3/2002 | |

* cited by examiner

Primary Examiner—Peter C. English
(74) Attorney, Agent, or Firm—Hudak, Shunk & Farine Co. L.P.A.

(57) ABSTRACT

Such systems typically have an extendable rollover bar, which in its extended position is locked against being pushed back in by a locking pawl that is in operative locking engagement with a toothed segment. To make it possible by simple means to use both hands to return the rollover bar to its retracted position when required, the invention provides a reversing lever, which can be manually brought to a self-holding position above dead center while unlocking the locking pawl before the rollover bar is pushed in. This self-holding position can be automatically canceled again just before the rollover bar reaches its standby position.

12 Claims, 4 Drawing Sheets

ROLLOVER PROTECTION SYSTEM FOR MOTOR VEHICLES WITH SELF-HOLDING UNLOCKING MECHANISM

FIELD OF THE INVENTION

The invention relates to a rollover protection system for motor vehicles. It comprises a rollover bar, which is received and guided in a guide unit fixed to the vehicle and which in its normal state is held in a lower retracted standby position by a holding device against the force of at least one preloaded compression drive spring and with the release of the holding device can be brought into an upper protective locked position by the spring force of the compression drive spring. The system further comprises a locking mechanism for motor vehicles with a rollover bar which is received and guided in a guide unit fixed to the vehicle and which in its normal state is held in a lower, retracted standby position by a holding device against the force of at least one preloaded compression drive spring and with the release of the holding device can be brought into an upper protective locked position by the spring force of the compression drive spring. The system further comprises a locking mechanism that includes two locking elements in the form of a toothed segment and a locking pawl preloaded by at least one spring. One of these locking elements is fixed to the vehicle while the other locking element is connected with the rollover bar. The locking pawl is associated with a self-holding mechanism that holds the pawl in its unlocked position. On the one hand this mechanism has a double-armed reversing lever that is rotatably coupled to the same support to which the locking pawl is coupled. On the other hand it includes an extension of the locking pawl that is formed in the manner of a guide slot and has an offset end stop. This extension operatively engages with one lever arm (operative lever arm) of the reversing lever in such a way that when the reversing lever is manually pivoted, the locking pawl is pivoted in a self-holding manner while releasing its operative locking engagement with the toothed segment.

BACKGROUND OF THE INVENTION

Such rollover protection systems serve to protect the occupants of motor vehicles that do not have a protective roof, typically convertibles or sports cars.

It is known in the art to provide a fixed rollover bar extending across the entire width of the vehicle or to assign a fixed, non-height adjustable, rollover bar to each vehicle seat.

In both of these solutions, the increased air resistance and driving noise as well as the effect on the appearance of the vehicle in the case of convertibles are perceived as drawbacks.

As a result, design solutions in which the rollover bar is normally retracted and is rapidly extended into its protective position in case of danger, i.e. in case of an impending rollover, in order to prevent the vehicle occupants from being crushed by the rolling vehicle, are becoming increasingly prevalent in the market.

These solutions typically have a rollover bar for each seat which is U-shaped or made of structural sections and which is guided in a cassette housing fixed to the vehicle. This rollover bar is normally held in its lower standby position by a holding device against the bias of a compression drive spring. In case of a rollover, the holding device is released, sensor-controlled, to bring the rollover bar into its upper protective position by the spring force. An operatively engaging locking mechanism then prevents the rollover bar from being pushed back into the cassette.

The holding device typically comprises a holding member which is fixed to the rollover bar and which is in releasable operative mechanical engagement with a trigger member on a sensor-controlled trigger system that is typically formed by a trigger magnet, the so-called crash magnet, or by a pyrotechnic trigger member.

The locking mechanism typically comprises a rotatably coupled spring-loaded detent with toothed segments, also referred to as a locking pawl, and a fixed toothed bar, a notched pin or the like. One locking element is connected with the rollover bar while the other is fixed to the vehicle.

Such a cassette construction of a rollover bar protection system is disclosed, for instance, in German Patent Specification DE 100 40 642 C1. A further development of the cassette system is disclosed in German Laid Open Publication DE 43 42 400 A1.

Once the rollover bar has been triggered it is operationally necessary, particularly for testing/inspection purposes, to unlock the system manually and to push the rollover bar manually into the cassette against the force of the preloaded compression drive spring. In the system according to the cited document DE 43 42 400 C2, the locking pawl has an extended lever arm that makes it possible manually to pivot the locking pawl against the force of the preloading spring while the rollover bar is in its extended state and thereby operatively to disengage the locking pawl from the notched pin and to enable the rollover bar to be pushed in manually. The problem is that the two processes must be carried out simultaneously, i.e. the operator has to use one hand to pivot the locking pawl and the other hand to push the rollover bar into the cassette. This pushing-in requires substantial force to compress the strong compression drive springs.

The German Patent Specification DE 199 10 424 C1 discloses a self-holding unlocking mechanism in rollover bar protection systems, which automatically holds the locking pawl in its unlocked position after it has been manually unlocked, so that the rollover bar can be pushed into the cassette with both hands. Once the initial position is reached, it is automatically locked. This prior-art unlocking mechanism is very complex, however. It has a comparatively large number of components, which must be very precisely coordinated with one another.

The same is true for the self-holding unlocking mechanism of the initially described rollover protection system according to the German laid Open Publication DE 100 42 420 A1. For its self-holding action this mechanism has a reversing lever, which is manually brought into a dead center position and which is to be held in this basically unstable equilibrium position by suitable additional means with the aid of positive or frictional locking. This self-holding action can be cancelled depending on the position of the rollover bar by means of a complex tappet/rod system.

SUMMARY OF THE INVENTION

The object of the invention is to provide a self-holding unlocking mechanism for the initially described rollover protection system, which requires very few additional components and has a very simple design.

For a rollover protection system for motor vehicles, comprising a rollover bar which is received and guided in a guide unit fixed to the vehicle and which in its normal state is held in a lower, retracted standby position by a holding device against the force of at least one preloaded compression drive spring, and through the release of the holding device can be brought into an upper protective locked position by the spring force of the compression drive spring, and comprising a locking mechanism for motor vehicles with a rollover bar which is received and guided in a guide unit fixed to the vehicle and which in its normal state is held in a lower, retracted standby position by a holding device against the force of at least one preloaded compression drive spring, and with the release of the holding device can be brought into an upper protective locked position by the spring force of the compression drive spring, and comprising a locking mechanism that includes two locking elements in the form of a toothed segment and a locking pawl preloaded by at least one spring, one of these locking elements being fixed to the vehicle while the other locking element is connected with the rollover bar, wherein the locking pawl is associated with a self-holding mechanism that holds the pawl in its unlocked position, which mechanism on the one hand has a double-armed reversing lever that is rotatably coupled to the same support to which the locking pawl is coupled, and on the other hand comprises an extension of the locking pawl that is formed in the manner of a guide slot and has an offset end stop, which extension operatively engages with one lever arm (operative lever arm) of the reversing lever in such a way that when the reversing lever is manually pivoted, the locking pawl is pivoted in a self-holding manner while releasing its locking operative engagement with the tooth segment, this object is attained according to the invention in that the extension of the locking pawl, with respect to its guide slot and the end stop, is configured in such a way that when the other, longer lever arm (actuating lever arm) is manually operated, the reversing lever can be brought into a position above dead center which is limited by the end stop and that a control cam with a control surface is mounted to the rollover bar in such a way that the control surface, immediately before the standby position is reached as an extended rollover bar is being pushed in, operatively engages with the actuating lever arm of the reversing lever while the reversing lever is pivoted to before its dead center.

This measure according to the invention to bring the double-armed reversing lever to a stable position above dead center makes possible an effective self-holding unlocking action of the locking pawl by simple and thus cost-effective means.

The offset end stop for the operative lever arm of the reversing lever, which is provided at the end of the extension of the locking pawl, ensures a defined position above dead center.

To automatically cancel by simple means the blocking above dead center of the reversing lever, a design is provided in which a control cam with a control surface is mounted to the rollover bar in such a way that the control surface, just before the standby position is reached as an extended rollover bar is being pushed in, operatively engages with the actuating lever arm of the reversing lever while this reversing lever is pivoted to before its dead center.

The control cam is advantageously mounted to the head of the rollover bar.

To minimize the production costs for the locking pawl with its extension, a further embodiment provides that the extension of the locking pawl with its end stop is formed as an integral part of the locking pawl.

To achieve blocking above dead center of the reversing lever within the smallest possible space, a further development of the invention provides that the extension of the locking pawl be laterally bent at an acute angle relative to the longitudinal axis of the rollover bar above the operative engagement of the preloading spring and that the arms of the reversing lever form an obtuse angle.

To ensure a supple operative engagement between the control surface and the actuating lever arm, the actuating lever arm of the reversing lever is provided with a roller at its free end. This allows the control surface to slide easily over the roller.

BRIEF DESCRIPTION OF THE DRAWINGS

An exemplary embodiment of the invention will now be described with reference to the drawing in which.

DETAILED DESCRIPTION OF THE INVENTION

Figure 1:
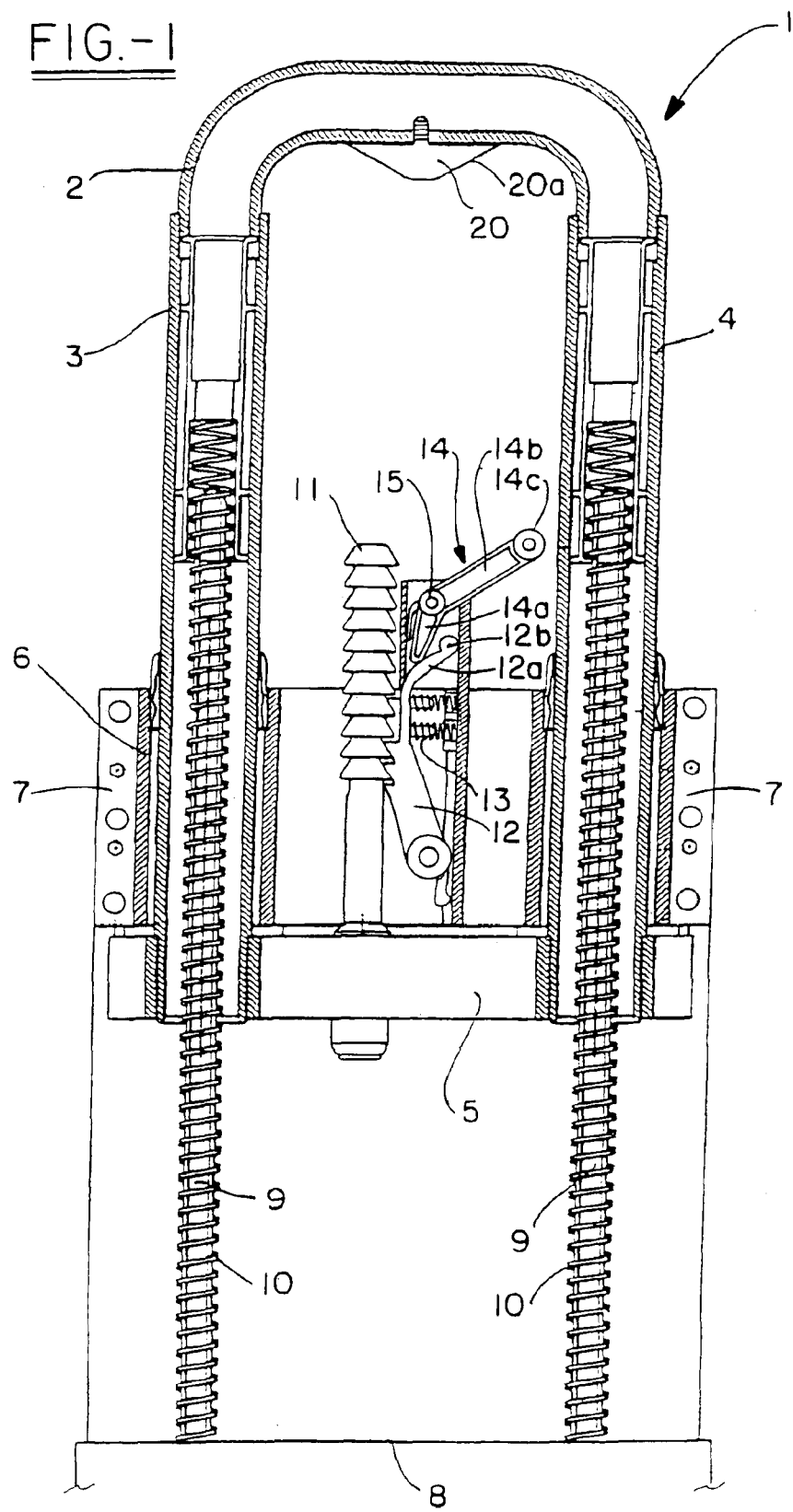
FIG. 1 is a partially cutaway front view of a rollover bar system with a self-holding unlocking mechanism in the extended state.
Figure 2:
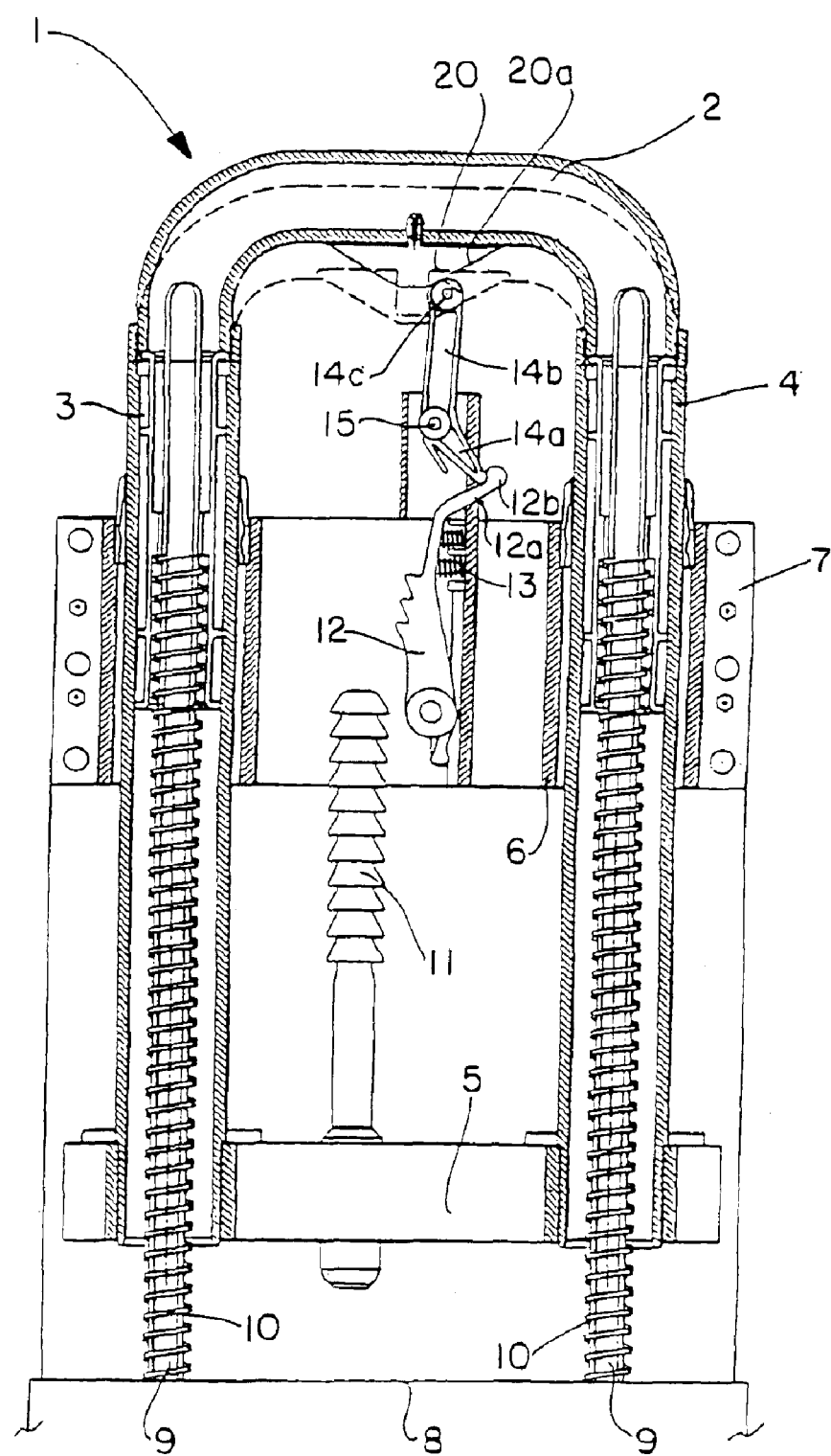
FIG. 2 is a front view according to FIG. 1 in the retracted state.

FIGS. 1 and 2 show an exemplary embodiment of the rollover bar system according to the invention with the rollover bar 1 depicted in its extended position in FIG. 1 and in its retracted position in FIG. 2.

The basic structure of the depicted rollover bar system according to the cassette principle is known, for instance, from the cited German Patent Specification DE 43 42 400 C2 and the associated further development in accordance with the German Laid Open Publication DE 43 42 400 A1.

The rollover bar is composed of three tubes, 2, 3, 4. The base of the rollover bar 1 is essentially formed by a curved tube 2, also referred to as the bar head, the ends of which are rigidly connected with two side tubes 3, 4 either by welding or by some other suitable joining process.

The ends of the side tubes 3, 4 are interconnected by a cross member 5.

The side tubes 3, 4 are mounted and guided in a guide block 6 of the cassette, which is fixed to the vehicle. The cross member is guided in U-shaped lateral profiles 7 of the cassette, which receive the guide block.

Two bolts 9 are fixed to the floor 8 of the cassette, each provided with a compression spring 10 for the rapid extension of the rollover bar 1. In the retracted state of the rollover bar 1 (FIG. 2) these compression springs are preloaded. To be able to hold the preloaded rollover bar in this position, a holding device (not depicted) with a sensor-controlled triggering system is provided. In case of an impending rollover, this holding device releases the rollover bar 1 so that the rollover bar is extended into its protective upper position (FIG. 1).

To maintain this protective position, the rollover bar must be locked in its extended position. A notched pin 11, which is fixed to the movable cross member 5, and a locking pawl 12, which is rotatably coupled and preloaded by two springs 13 inside the guide block 6, are used for this purpose in a manner known per Se. The springs 13 push the teeth of the locking pawl 12 into an operative engagement with the circumferential recesses of the notched pin 11 fixed to the rollover bar 1 and thereby prevent the notched pin and thus also the rollover bar from being pushed in downward direction under the action of a load. This locks the extended position. The multiple recesses in the notched pin 11 ensure locking even if the rollover bar 1 fails to reach its end position.

However, once the rollover bar is triggered, or mistriggered, it is operationally necessary for testing purposes to unlock the system manually and to push the rollover bar 1 into the cassette by hand. In the above-described system, the locking pawl has an extended lever arm that makes it possible to pivot the locking pawl manually against the force of the preloading springs when the rollover bar is in its extended position in order to disengage the locking pawl from the notched pin and to allow the rollover bar to be pushed in by hand. The problem is that these two processes must be carried out simultaneously, i.e. the operator has to use one hand to pivot the locking pawl and the other to push the rollover bar into the cassette. This pushing-in requires a substantial amount of force to compress the strong compression springs 10.

Figure 1A:
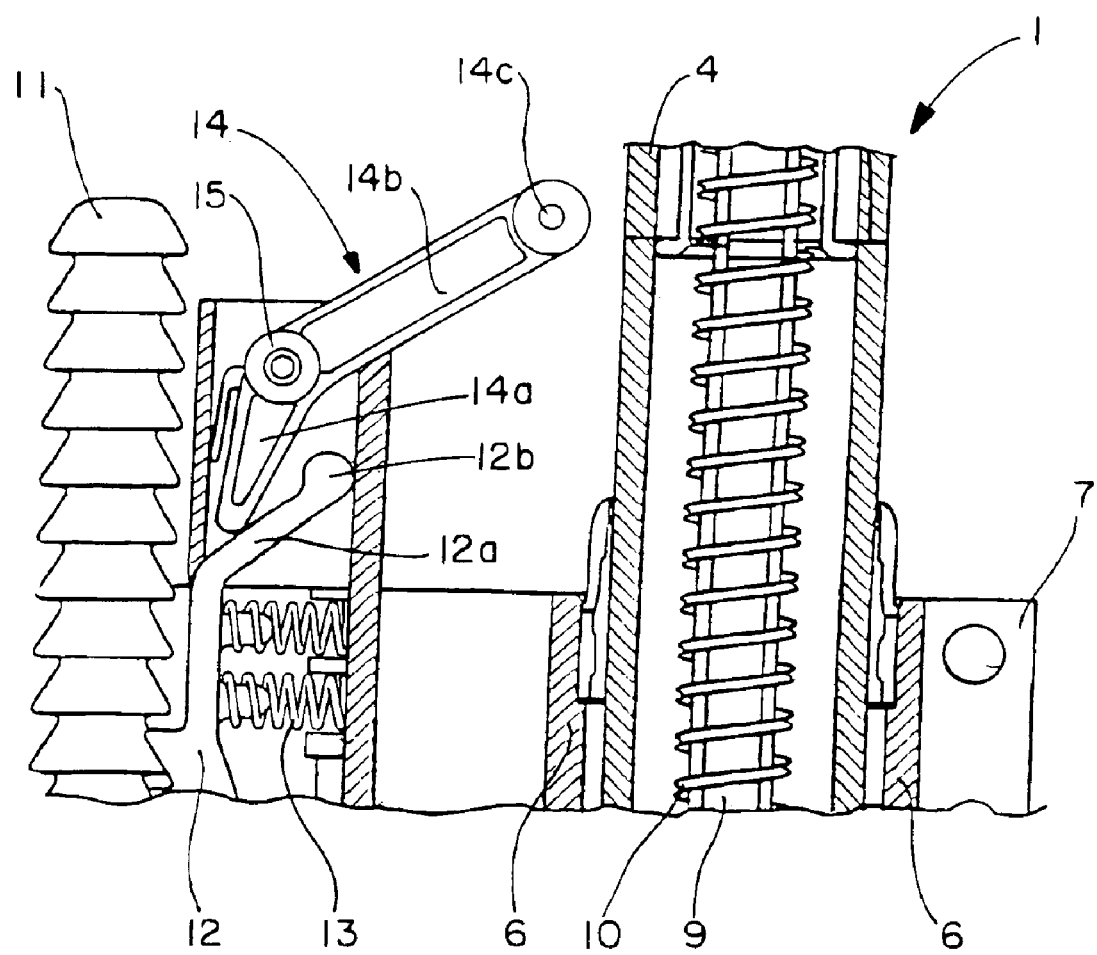
FIG. 1A is an enlarged detail of FIG. 1 illustrating the self-holding unlocking mechanism.
Figure 3:
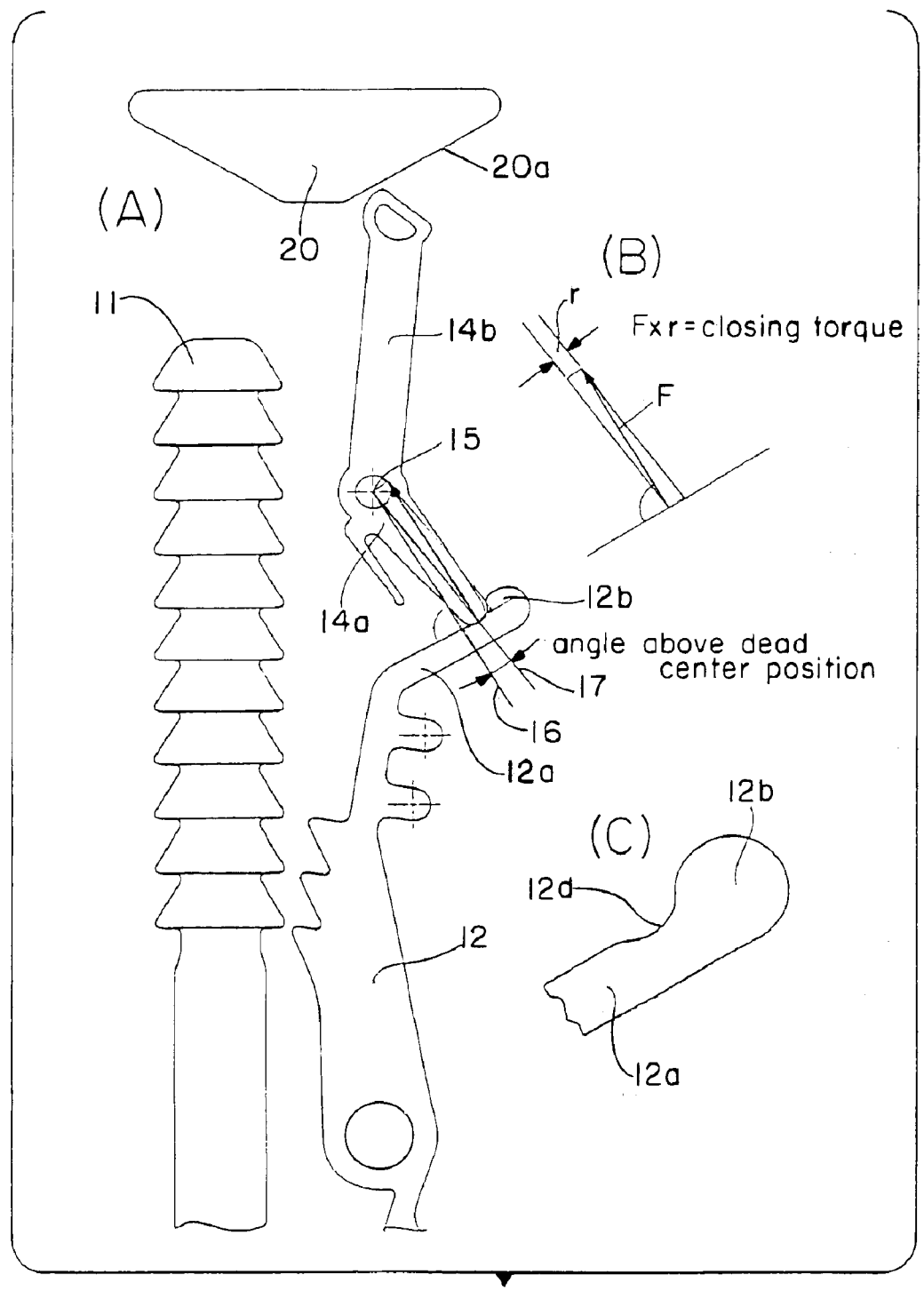
FIG. 3 is an enlarged detail of FIG. 2 illustrating the position above dead center in part A, the distribution of forces in this position in part B, and a detail of the operative engagement point of the reversing lever on the locking pawl in part C.

To make it possible to push in the extended rollover bar with both hands, the invention provides a self-holding action of the pivoted, i.e. the unlocked, locking pawl 12 by means of an angled reversing lever 14 which, like the locking pawl 12, is coupled in the guide block so as to be pivotable about an axis 15. This reversing lever 14, as shown in the detail of FIG. 1A, has a lower lever arm 14a, whose rounded end operatively engages an angled extension 12a of the locking pawl 12. The reversing lever 14 further has an upper angled lever arm 14b with which the reversing lever can be manually pivoted counterclockwise. This causes the rounded end of the lower lever arm 14a to slide onto the extension 12a and thereby to pivot the locking pawl 12 clockwise until the end comes to rest against the offset end 12b of the extension. In this position, the lever arm 14 is pivoted beyond its dead center, so that the springs 13 can no longer pivot it back over the extension 12a of the locking pawl. The reversing lever is therefore blocked in this position and does not need to be further actuated by hand. The operator now has both hands free to push in the rollover bar. This unlocking position of the reversing lever is shown in FIG. 2, which depicts the rollover bar in a retracted position just before its standby position, which is indicated by a dashed line. Details are shown in the detail drawing of FIG. 3. Parts A and B of the figure show the distribution of the forces in the position above dead center. The line 16 marks the exact dead center position. The lever arm 14a is at a 90° angle to the guide slot of the pawl extension 12a. The line 17 marks the position over dead center, i.e. the angle between lines 16 and 17 is the angle over the dead center position.

As Part B of the figure shows, this creates a closing torque F×r for the reversing lever, where F is determined by the preloading force of the springs 13 (FIG. 2).

As a safety against an unfavorable tolerance position of the mounted components, the pawl extension 12a, as shown in Part C of the figure, has an indentation 12c directly in front of the offset end 12b to provide a secure seat of the lever arm 14a.

To ensure that, when the standby position is reached, the locking pawl will automatically return to its locking position, a control cam 20 with a linearly sloping control surface 20a is provided on the bar head 2. In the position shown, this control surface is operatively engaged with a roller 14c that is mounted to the upper end of the lever arm. This operative engagement causes the reversing lever to be pivoted clockwise, so that the lower lever arm 14a disengages from the extension 12a. This cancels the blocking of the locking pawl and the springs 13 can return the locking pawl 12 into an operative locking engagement with the notched pin 11.

What is claimed is:

1. A rollover protection system for a motor vehicle, comprising:
a rollover bar which is received and guided in a guide unit adapted to be fixed to the vehicle and which in a normal state is held in a lower retracted standby position by a holding device against the force of at least one preloaded compression drive spring, and which with a release of the holding device can be brought into an upper protective locked position by the spring force of the compression drive spring, and comprising a locking mechanism that includes two locking elements in the form of a toothed segment and a locking pawl preloaded by at least one spring, one of the locking elements being fixed to the vehicle while the other locking element is connected with the rollover bar, wherein the locking pawl is associated with a self-holding mechanism that holds the pawl in an unlocked position and has a double-armed reversing lever that is rotatably coupled to a same support to which the locking pawl is coupled and includes an extension of the locking pawl that functions as a guide and an offset end stop and operatively engages with an operative lever arm of the reversing lever in such a way that when the reversing lever is manually pivoted, the locking pawl is pivoted in a self-holding manner while releasing its operative locking engagement with the toothed segment, wherein the extension of the locking pawl is configured in such a way that when an actuating lever arm is manually operated, the reversing lever can be brought into a position past dead center which is limited by the end stop, and a control cam with a control surface is mounted to the rollover bar in such a way that the control surface, immediately before the standby position is reached as an extended rollover bar is being pushed in, operatively engages with the actuating lever arm of the reversing lever while the reversing lever is pivoted to a position before dead center.

2. A rollover protection system as claimed in claim 1, wherein the extension of the locking pawl together with its end stop is formed integrally with the locking pawl.

3. A rollover protection system as claimed in claim 2, wherein the extension of the locking pawl, above the preloading spring extends obliquely, sloped at an acute angle relative to a longitudinal axis of the rollover bar.

4. A rollover protection system as claimed in claim 3, wherein the arms of the reversing lever form an obtuse angle.

5. A rollover protection system as claimed in claim 4, wherein the control cam is mounted to a bar head of the rollover bar.

6. A rollover protection system as claimed in claim 5, wherein the actuating lever arm of the reversing lever has a roller at a free end thereof.

7. A rollover protection system as claimed in claim 6, wherein the extension of the locking pawl has a trough shaped indentation for the operative engagement of the operative lever arm directly in front of the end stop.

8. A rollover protection system as claimed in claim 1, wherein the extension of the locking pawl, above the preloading spring extends obliquely, sloped at an acute angle relative to a longitudinal axis of the rollover bar.

9. A rollover protection system as claimed in claim 1 wherein the arms of the reversing lever form an obtuse angle.

10. A rollover protection system as claimed in claim 1, wherein the control cam is mounted to a bar head of the rollover bar.

11. A rollover protection system as claimed in claim 1, wherein the actuating lever arm of the reversing lever has a roller at a free end thereof.

12. A rollover protection system as claimed in claim 1, wherein the extension of the locking pawl has a trough shaped indentation for the operative engagement of the operative lever arm directly in front of the end stop.

* * * * *